US012809522B2

(12) United States Patent
Han

(10) Patent No.: US 12,809,522 B2
(45) Date of Patent: Nov. 24, 2026

(54) MEMORY CONTROLLERS AND OPERATION METHODS THEREOF, MEMORY SYSTEMS, ELECTRONIC DEVICES

(71) Applicant: YANGTZE MEMORY TECHNOLOGIES CO., LTD., Wuhan (CN)

(72) Inventor: Peian Han, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 70 days.

(21) Appl. No.: 18/612,163

(22) Filed: Mar. 21, 2024

(65) Prior Publication Data

US 2025/0094053 A1 Mar. 20, 2025

(30) Foreign Application Priority Data

Sep. 19, 2023 (CN) ......................... 202311212547.3

(51) Int. Cl.
*G06F 3/06* (2006.01)

(52) U.S. Cl.
CPC .......... *G06F 3/0613* (2013.01); *G06F 3/0653* (2013.01); *G06F 3/0683* (2013.01)

(58) Field of Classification Search
CPC .... G06F 3/0613; G06F 3/0653; G06F 3/0683; G06F 3/061; G06F 3/0659; G06F 3/0679; G06F 3/06
See application file for complete search history.

(56) References Cited

U.S. PATENT DOCUMENTS

| | | | | |
|---|---|---|---|---|
| 9,052,835 B1 * | 6/2015 | Darrington | G06F 3/061 | |
| 9,996,262 B1 * | 6/2018 | Nemawarkar | G06F 3/0673 | |
| 10,282,103 B1 * | 5/2019 | Stone | G06F 13/24 | |
| 2016/0034187 A1 * | 2/2016 | Desai | G06F 3/0659 | 711/115 |
| 2017/0199667 A1 * | 7/2017 | Zia | G06F 13/4282 | |
| 2019/0303024 A1 * | 10/2019 | Iwai | G06F 3/061 | |
| 2023/0176785 A1 * | 6/2023 | Singh | G06F 3/0605 | 711/154 |
| 2025/0068554 A1 * | 2/2025 | Sapuntzakis | G06F 3/067 | |

FOREIGN PATENT DOCUMENTS

| | | |
|---|---|---|
| CN | 109992201 A | 7/2019 |
| CN | 112732171 A | 4/2021 |
| CN | 115309321 A | 11/2022 |
| CN | 116225987 A | 6/2023 |

OTHER PUBLICATIONS

Yangtze Memory Technologies Co., Ltd. "First Examination Opinion Notice," Pub. Date: Sep. 15, 2025, Chinese Patent App. No. 202311212547.3, 11 p. (plus 11 p. translation).

* cited by examiner

*Primary Examiner* — Khoa D Doan
(74) *Attorney, Agent, or Firm* — Conley Rose, P.C.

(57) ABSTRACT

Examples of the present disclosure provide memory controllers and operation methods thereof, memory systems, and electronic devices. An example memory controller includes a host interface circuit configured to: obtain commands from a host and queue the commands in a command queue; and a processor coupled to the host interface circuit and configured to: detect whether there is an abort command in the command queue, wherein the abort command is to instruct to abort a target command in the command queue; and abort the target command in response to the abort command.

20 Claims, 8 Drawing Sheets

MEMORY CONTROLLERS AND OPERATION METHODS THEREOF, MEMORY SYSTEMS, ELECTRONIC DEVICES

CROSS-REFERENCE TO RELATED APPLICATIONS

The present application claims priority to Chinese Patent Application No. 2023112125473, which was filed Sep. 19, 2023, is titled "MEMORY CONTROLLER AND ITS OPERATING METHOD, MEMORY SYSTEM, ELECTRONIC EQUIPMENT," and is hereby incorporated herein by reference in its entirety.

TECHNICAL FIELD

Examples of the present disclosure relate to the field of semiconductor technologies, and in examples to a memory controller and an operation method thereof, a memory system, and an electronic device.

BACKGROUND

In recent years, the semiconductor integrated circuit industry has experienced rapid development. With the continuous advancement of semiconductor manufacturing processes, the size of features of semiconductor devices continues to shrink, the integration density of memories is getting higher and higher, and their performance is becoming more and more powerful.

SUMMARY

The present disclosure provides a memory controller and an operation method thereof, a memory system, an electronic device, and a computer-readable storage medium.

In a first aspect, the present disclosure provides a memory controller, comprising:

a host interface circuit configured to: obtain a plurality of commands from a host and queue the plurality of commands in a command queue; and a processor coupled to the host interface circuit and configured to: detect whether there is an abort command in the command queue, wherein the abort command is to instruct to abort a target command in the command queue; and abort the target command in response to the abort command.

In some examples, the plurality of commands comprise at least one admin command, the command queue comprises an admin command queue, and the admin command is queued in the admin command queue, and the processor is configured to: detect whether there is a first sub-abort command in the admin command queue, wherein the abort command comprises the first sub-abort command, the first sub-abort command is to instruct to abort a target admin command in the admin command queue, and the target command comprises the target admin command; and abort the target admin command in response to the first sub-abort command.

In some examples, the plurality of commands further comprise at least one I/O command, the command queue further comprises an I/O command queue, and the I/O command is queued in the I/O command queue, and the processor is configured to: detect whether there is a second sub-abort command in the admin command queue, wherein the abort command comprises the second sub-abort command, the second sub-abort command is to instruct to abort a target I/O command in the I/O command queue, and the target command comprises the target I/O command; and abort the target I/O command in response to the second sub-abort command.

In some examples, each of the commands has a command identifier, the command identifiers of any two of the commands are different, and the abort command comprises a target command identifier of the target command, and the processor is further configured to: determine the target command identifier of the target command in response to the abort command; and match the command identifiers of the plurality of commands in the command queue with the target command identifier to determine the target command in the command queue.

In some examples, the host interface circuit is further configured to: obtain a plurality of command queues from the host, wherein each of the command queues has a queue identifier, the queue identifiers of any two of the command queues are different, and the abort command further comprises a target queue identifier of the target command queue where the target command is located; and the processor is further configured to: determine the target queue identifier of the target command queue in response to the abort command; and match the queue identifiers of the plurality of command queues with the target queue identifier to determine the target command queue in the plurality of command queues.

In some examples, the plurality of commands comprise at least one I/O command, the command queue comprises an admin command queue and an I/O command queue, and the I/O command is queued in the I/O command queue, and the processor is configured to: determine the target command identifier of a target I/O command in response to a second sub-abort command, wherein the abort command comprises the second sub-abort command, the second sub-abort command is to instruct to abort the target I/O command in the I/O command queue, and the target command comprises the target I/O command; and match the command identifiers of the I/O commands in the I/O command queue with the target command identifier one by one to determine the target I/O command in the I/O command queue.

In some examples, the host interface circuit is configured to: obtain the I/O commands one by one from the host; and the processor is configured to: each time one of the I/O commands is obtained, match the command identifier of the obtained one of the I/O commands with the target command identifier to determine the target I/O command.

In some examples, the processor is configured to: obtain the number of the I/O commands to be sent at a preset moment in the host; and each time one of the I/O commands for the preset moment is obtained, match the command identifier of the obtained one of the I/O commands for the preset moment with the target command identifier to determine the target I/O command.

In some examples, the processor is further configured to: when the I/O commands updated after the preset moment are obtained, the matching of the command identifiers of the updated I/O commands with the target command identifier is no longer performed.

In a second aspect, the present disclosure provides an operation method of a memory controller, the memory controller comprising a host interface circuit and a processor, and the operation method comprising: obtaining, by the host interface circuit, a plurality of commands from a host and queue the plurality of commands in a command queue; detecting, by the processor, whether there is an abort command in the command queue, wherein the abort command is to instruct to abort a target command in the command queue; and aborting, by the processor, the target command in response to the abort command.

In some examples, the plurality of commands comprise at least one admin command, the command queue comprises an admin command queue, and the admin command is queued in the admin command queue, and detecting, by the processor, whether there is an abort command in the command queue comprises: detecting, by the processor, whether there is a first sub-abort command in the admin command queue, wherein the abort command comprises the first sub-abort command, the first sub-abort command is to instruct to abort a target admin command in the admin command queue, and the target command comprises the target admin command; and aborting, by the processor, the target command in response to the abort command comprises: aborting, by the processor, the target admin command in response to the first sub-abort command.

In some examples, the plurality of commands further comprise at least one I/O command, the command queue further comprises an I/O command queue, and the I/O command is queued in the I/O command queue, and detecting, by the processor, whether there is an abort command in the command queue comprises: detecting, by the processor, whether there is a second sub-abort command in the admin command queue, wherein the abort command comprises the second sub-abort command, the second sub-abort command is to instruct to abort a target I/O command in the I/O command queue, and the target command comprises the target I/O command; and aborting, by the processor, the target command in response to the abort command comprises: aborting, by the processor, the target I/O command in response to the second sub-abort command.

In some examples, each of the commands has a command identifier, the command identifiers of any two of the commands are different, and the abort command comprises a target command identifier of the target command, and the operation method further comprises: determining, by the processor, the target command identifier of the target command in response to the abort command; and matching, by the processor, the command identifiers of the plurality of commands in the command queue with the target command identifier to determine the target command in the command queue.

In some examples, the operation method further comprises: obtaining, by the host interface circuit, a plurality of command queues from the host, each of the command queues has a queue identifier, the queue identifiers of any two of the command queues are different, and the abort command further comprises a target queue identifier of the target command queue where the target command is located; determining, by the processor, the target queue identifier of the target command queue in response to the abort command; and matching, by the processor, the queue identifiers of the plurality of command queues with the target queue identifier to determine the target command queue in the plurality of command queues.

In some examples, the plurality of commands comprise at least one I/O command, the command queue comprises an admin command queue and an I/O command queue, and the I/O command is queued in the I/O command queue, and determining, by the processor, the target command identifier in response to the abort command comprises: determining, by the processor, the target command identifier of a target I/O command in response to the second sub-abort command, wherein the abort command comprises the second sub-abort command, the second sub-abort command is to instruct to abort the target I/O command in the I/O command queue, and the target command comprises the target I/O command; and matching, by the processor, the command identifiers of the plurality of commands in the command queue with the target command identifier comprises: matching, by the processor, the command identifiers of the I/O commands in the I/O command queue with the target command identifier one by one to determine the target I/O command in the I/O command queue.

In some examples, obtaining, by the host interface circuit, a plurality of commands from a host comprises: obtaining, by the host interface circuit, the I/O commands one by one from the host; and matching, by the processor, the command identifiers of the I/O commands in the I/O command queue with the target command identifier one by one comprises: each time one of the I/O commands is obtained by the host interface circuit, matching, by the processor, the command identifier of the obtained one of the I/O commands with the target command identifier to determine the target I/O command.

In some examples, each time one of the I/O commands is obtained by the host interface circuit, matching, by the processor, the command identifier of the obtained one of the I/O commands with the target command identifier comprises: obtaining, by the processor, the number of the I/O commands to be sent at a preset moment in the host; and each time one of the I/O commands for the preset moment is obtained by the host interface circuit, matching, by the processor, the command identifier of the obtained one of the I/O commands for the preset moment with the target command identifier to determine the target I/O command.

In some examples, the operation method further comprises: when the I/O commands updated after the preset moment are obtained by the host interface circuit, the matching of the command identifiers of the updated I/O commands with the target command identifier is no longer performed by the processor.

In a third aspect, the present disclosure provides a memory system, comprising the memory controller set forth in any of the above examples and a memory device, wherein the memory controller is configured to control the memory device.

In a fourth aspect, the present disclosure provides an electronic device, comprising the memory system set forth in the above examples.

In a fifth aspect, the present disclosure provides a computer-readable storage medium storing thereon executable instructions that, when executed, implement the operation method set forth in any of the above examples.

In the example of the present disclosure, the host interface circuit obtains a plurality of commands from a host and queues the plurality of commands in a command queue. The processor detects whether there is an abort command in the command queue, and aborts a target command in response to the abort command. In this way, the abort command will be executed by the processor timely and effectively to reduce data loss caused by the target command being executed before the abort command, thereby improving the operating efficiency and data reliability of the memory system.

DETAILED DESCRIPTION

Figure 1:
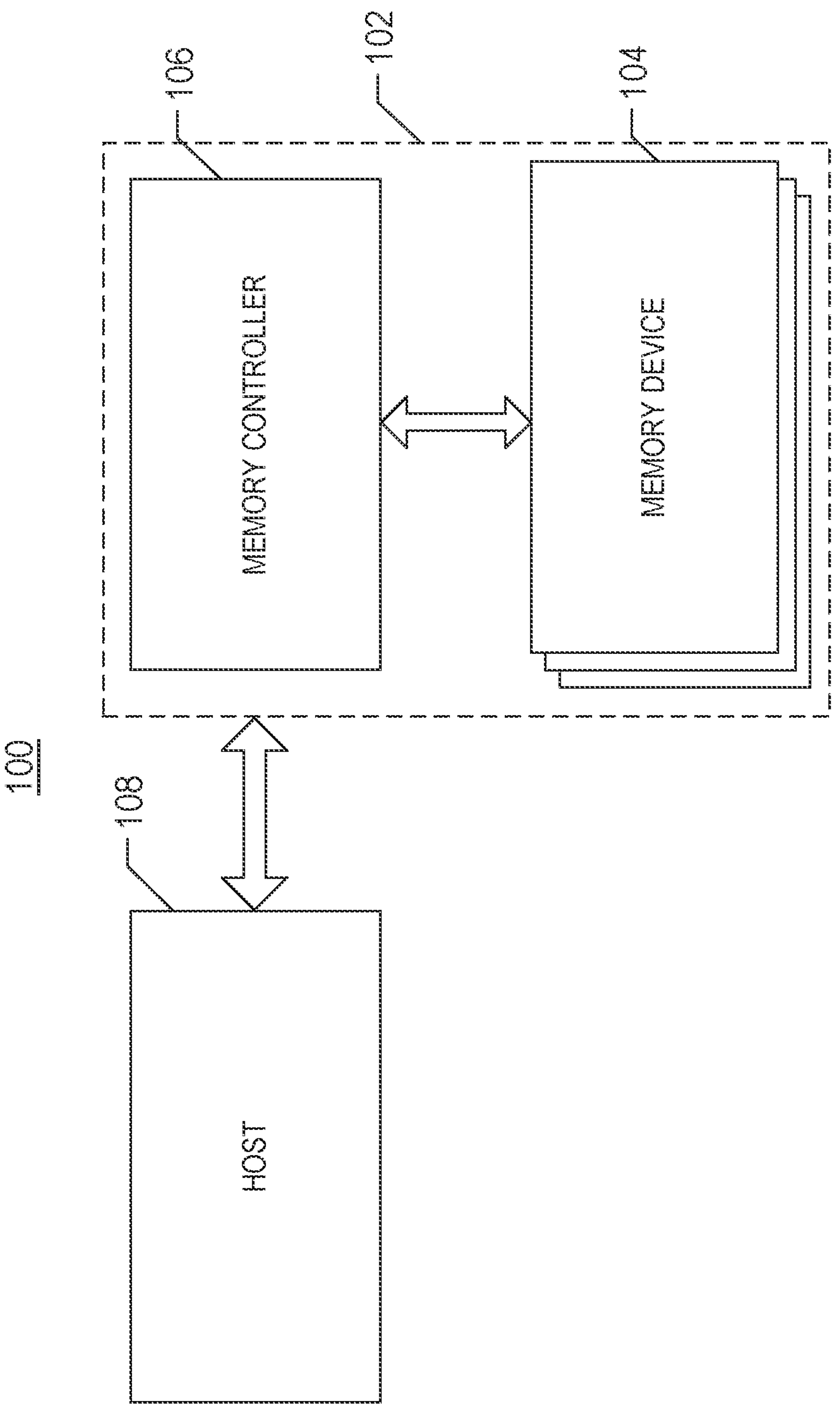
FIG. 1 is a schematic diagram of a system with a memory according to an example of the present disclosure.

To facilitate understanding of the present disclosure, examples of the present disclosure will be described in more detail below with reference to the accompanying drawings. Although examples of the present disclosure are shown in the drawings, it should be understood that the present disclosure may be implemented in various ways and should not be limited to the detailed description set forth herein. Rather, these examples are provided so that the present disclosure can be more thoroughly understood and the scope of the present disclosure can be conveyed to those skilled in the art.

In the following description, numerous specific details are given in order to provide a more thorough understanding of the present disclosure. It will be apparent, however, to one skilled in the art that the present disclosure may be practiced without one or more of these details. In some examples, some technical features well-known in the art are not described to avoid confusion with the present disclosure; that is, not all features of the actual example are described here, and well-known functions and structures are not described in detail.

Terms can be understood, at least in part, from usage in the context. For example, depending at least in part on context, the term "one or more" as used herein may be used to describe any feature, structure or characteristic in the singular sense, or may be used to describe a combination of features, structures or characteristics in the plural sense. Similarly, terms such as "a/an" or "said" may equally be understood to convey a singular usage or to convey a plural usage, depending at least in part on the context. Additionally, the term "based on" may be understood as not intended to convey an exclusive set of factors, and may instead allow for the presence of additional factors that are not explicitly described, again depending at least in part on the context.

The terminology used herein is for the purpose of describing particular examples only and is not to be taken as a limitation of the present disclosure unless otherwise stated. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . " includes any and all combinations of the associated listed items.

In order to understand the present disclosure, detailed operations and detailed structures will be provided in the following description to explain the technical solutions of the present disclosure. Examples of the present disclosure are described in detail below. However, in addition to these detailed descriptions, the present disclosure may be implemented in other ways.

A semiconductor memory device may be controlled by a memory controller, and the memory controller may control the operation of the semiconductor memory device based on at least one of a plurality of requests or commands from the host. Therefore, improving the timeliness of command execution by the memory controller to improve the operating efficiency and data reliability of the memory system may be useful.

FIG. 1 illustrates a schematic diagram of a system 100 having a memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory therein.

As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from the memory device 104.

Memory controller 106 is coupled to the memory device 104 and host 108 and is configured to control the memory device 104, according to some examples. Memory controller 106 can manage the data stored in memory device 104 and communicate with host 108. In some examples, memory controller 106 is designed for operating in a low duty-cycle environment like secure digital memory cards (SD cards), compact Flash (CF) cards, universal serial bus (USB) Flash drives, or other media for use in electronic devices, such as personal computers, digital cameras, mobile phones, etc. In some examples, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of the memory device 104, such as read, erase, and write (e.g., program) operations. Memory controller 106 can also be configured to manage various functions with respect to the data stored or to be stored in the memory device 104 including, but not limited to bad-block management, garbage collection, logical-to-physical address conversion, wear leveling, etc. In some examples, memory controller 106 is further configured to process error correction codes (ECC) with respect to the data read from or written to the memory device 104. Any other suitable functions may be performed by memory controller 106 as well, for example, formatting the memory device 104. Memory controller 106 can communicate with a host (e.g., host 108) according to a particular communication protocol. For example, memory controller 106 may communicate with the host 108 through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI)

protocol, an enhanced small disk interface (ESDI) protocol, an integrated drive electronics (IDE) protocol, a Firewire protocol, etc.

Figure 2B:
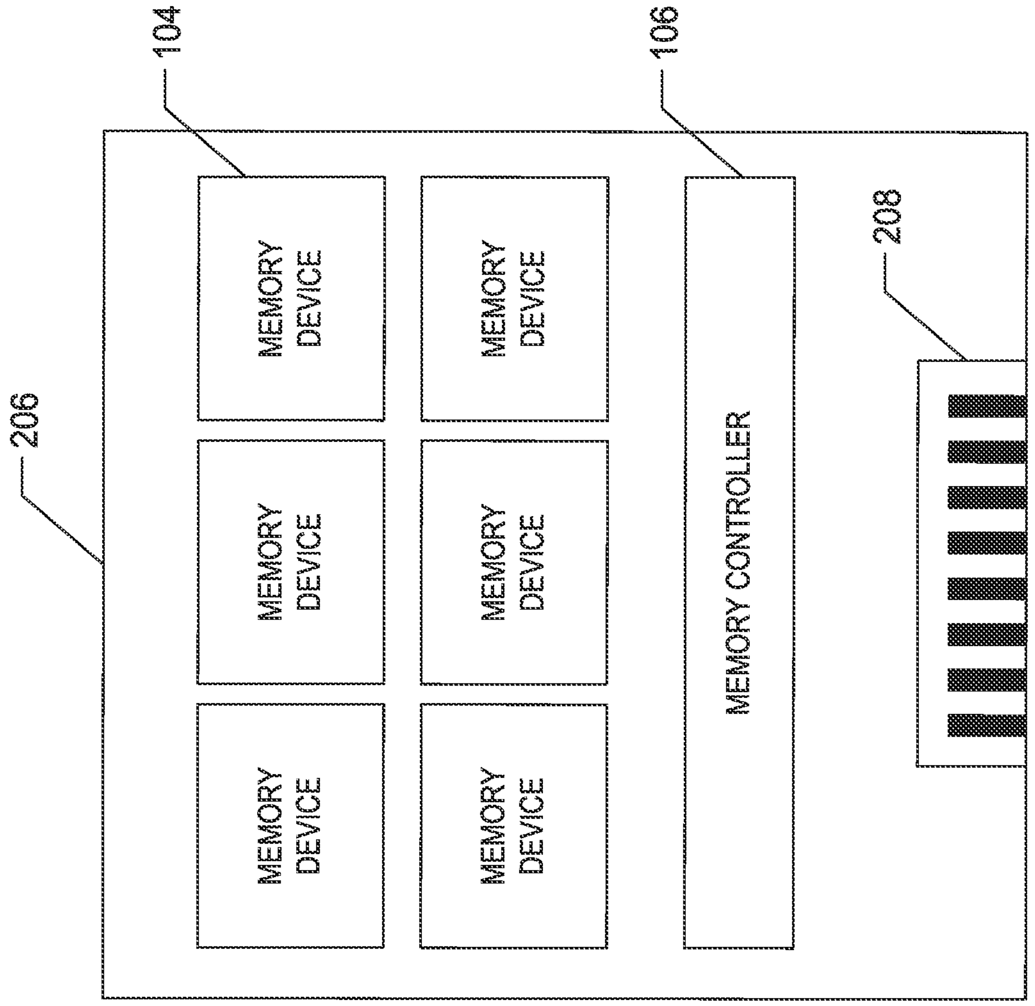
FIG. 2B is a schematic diagram of a solid state drive (SSD) according to an example of the present disclosure.
Figure 2A:
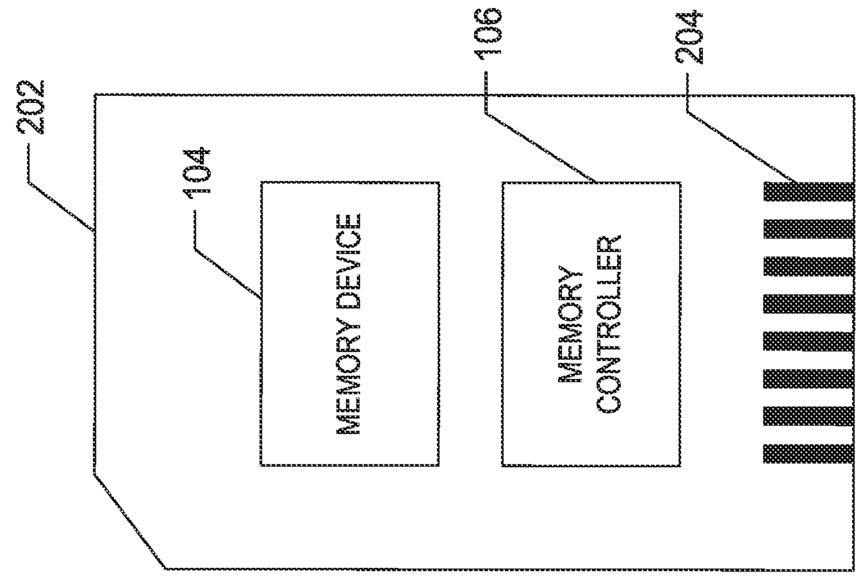
FIG. 2A is a schematic diagram of a memory card according to an example of the present disclosure.

Memory controller 106 and one or more memory devices 104 can be integrated into various types of storage devices, for example, be included in the same package, such as a universal Flash storage package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC), a reduced-size MMC (RS-MMC), a multi-media card micro (MMCmicro), an SD card (SD, miniSD, microSD, SDHC), a universal flash storage (UFS), etc. Memory card 202 can further include a memory card connector 204 coupling the memory card 202 with a host (e.g., host 108 in FIG. 1). In another example as shown in FIG. 2B, the memory controller 106 and multiple memory devices 104 may be integrated into an SSD 206. SSD 206 can further include an SSD connector 208 coupling SSD 206 with a host (e.g., host 108 in FIG. 1). In some examples, at least one of the storage capacity or the operation speed of SSD 206 is greater than those of memory card 202.

In the examples of the present disclosure, each of the dies may include one or more memory cell arrays. One type of memory cell, such as a single-level cell (SLC), can store one bit per cell. Other types of memory cells, such as Multi-Level Cell (MLC), Trinary-Level Cell (TLC), Quad-Level Cell (QLC) and Penta-Level Cell (PLC) can store multiple bits per cell. In some examples, each of the memory devices may include one or more memory cell arrays, such as an SLC array, an MLC array, a TLC array, a QLC array, or any combination of such memory cell arrays.

Figure 3:
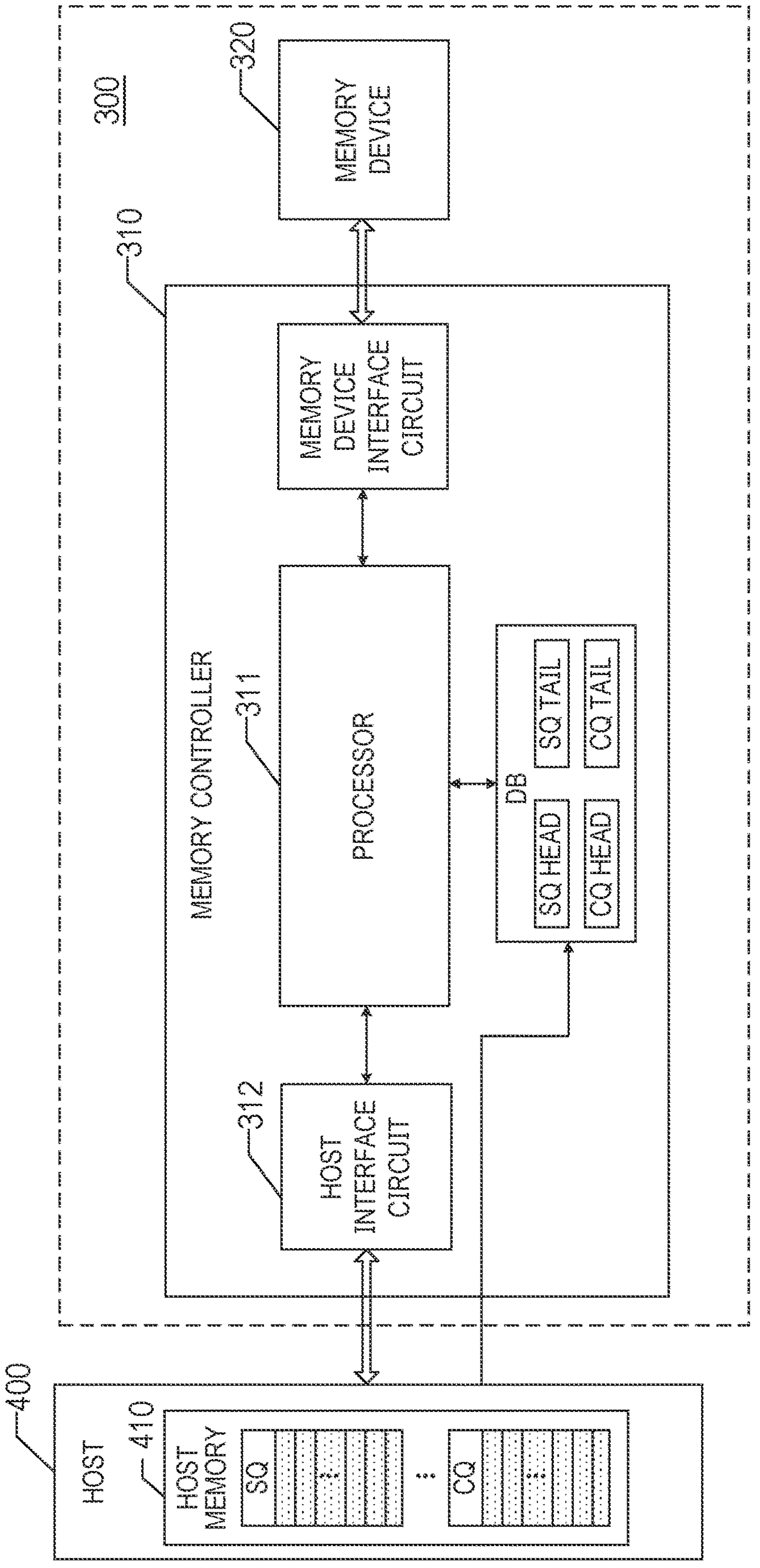
FIG. 3 is a schematic diagram of a memory system according to an example of the present disclosure.

FIG. 3 shows a memory system 300 according to an example of the present disclosure. The memory system 300 includes a memory controller 310 and one or more memory devices 320 coupled to the memory controller 310. The memory controller 310 includes at least a processor 311 and a host interface circuit 312. The host interface circuit 312 is connected to the host 400. The host interface circuit 312 can obtain multiple commands from the host 400 and queue the multiple commands in a command queue. The processor 311 can execute the multiple commands in the command queue in a certain order to control the memory device 320 to perform operations such as read, write, and erase. For example, the memory system 300 may be a Non-Volatile Memory Express (NVMe) solid state drive. A solid state drive that supports the NVMe protocol has many advantages such as low latency, low power consumption, and high bandwidth. It should be noted that the memory controller, memory system, electronic device, computer-readable storage medium and the like mentioned in this disclosure can also be based on other interface protocols known in the art, and no excessive restrictions are imposed in this respect.

Under the NVMe protocol, the host 400 can implement command interaction with the memory system 300 through a submission queue (SQ) and a completion queue (CQ) stored in the host memory 410, and a doorbell register (DB) in the memory controller 310. The DB stores a SQ Head, a SQ Tail, a CQ Head, and a CQ Tail. SQ Tail is to indicate the number of commands written by the host 400 in SQ, that is, the number of commands to be executed. SQ Head is to indicate the number of commands that the memory controller 310 has obtained from SQ. CQ Tail is to indicate the number of commands that the memory controller 310 has executed. CQ Head is to indicate the number of commands of which the execution has completed, as confirmed by the host 400. Here, the number of SQs and CQs in the host memory 410 and the command capacity can be configured according to actual needs. That is, the host memory 410 can include more than one pair of SQs and CQs. In some examples, SQ Head, SQ Tail, CQ Head and CQ Tail can be stored by using 4 doorbell registers respectively.

For example, first, the host 400 can write 3 commands into the SQ, and at the same time, the host 400 updates the SQ Tail in the DB to 3. Here, the host 400 updates the SQ Tail to notify the memory controller 310 that there are new commands that need to be obtained and executed. Then, the memory controller 310 fetches the 3 commands written by the host 400 from the SQ in response to the SQ Tail being updated to 3, and updates the SQ Head in the DB to 3. At the same time, the memory controller 310 will also send information of the SQ Head to the host 400 to notify the host 400 of the fetched commands. Afterwards, the memory controller 310 executes two of the commands, and then the memory controller 310 writes the information of the two commands of which the execution has completed into the CQ of the host memory 410, and updates the CQ Tail in the DB to 2. At the same time, the memory controller 310 will also send information the CQ Tail to the host 400 to notify the host 400 that the execution of some of the commands is completed. Finally, the host 400 fetches the information of the two commands of which the execution has completed from the CQ. After the host 400 confirms that the processing is completed, the host 400 updates the CQ Head in the DB to 2. It should be noted that the memory controller 310 can perform write and read operations on the DB, but the host 400 can only perform write operations on the DB and cannot perform read operations on the DB. Therefore, after updating the SQ Head and CQ Tail, the memory controller 310 will also send information of the SQ Head and CQ Tail to the host.

SQ and CQ can be divided into two types, one is an admin command queue, and the other is an I/O command queue. The commands in the admin command queue may include multiple types of admin commands, such as setting commands, get log page commands, abort commands, firmware update commands, etc. The commands in the I/O command queue can include multiple types of I/O commands, such as read commands, write commands, etc. There may be only one pair of admin submission queue and admin completion queue in the host memory 410, but any pair (including 0 pair) of I/O submission queue and I/O completion queue may exist. The host interface circuit 312 in the memory controller 310 can obtain an admin command queue to be executed and any number of I/O command queues to be executed (including 0 I/O command queue, that is, no I/O command queue may be obtained) from the host memory 410. In some examples, the execution priority of the admin command queue is the highest. That is, the memory controller 310 will prioritize the execution of the admin commands in the admin command queue, then execute the I/O commands in the I/O command queue, and multiple I/O command queues can be assigned different priorities.

The abort command can indicate to abort a target command, the target command herein can be either an admin command or an I/O command. It is noted that the abort command is a "best effort" command, that is, even if the memory controller 310 does not actually execute the abort command (the target command is not aborted), it will not violate the command execution order specified by the NVMe protocol. In some examples, in the NVMe protocol, the memory controller 310 uses firmware to execute admin commands in sequence according to the command order determined by the host. If the target command is ranked before the abort command, the memory controller 310 will execute the target command first, which will prevent the subsequent abort command from aborting the target command in time. It should be noted that an admin command queue can include multiple abort commands to abort multiple target commands.

Figure 4A:
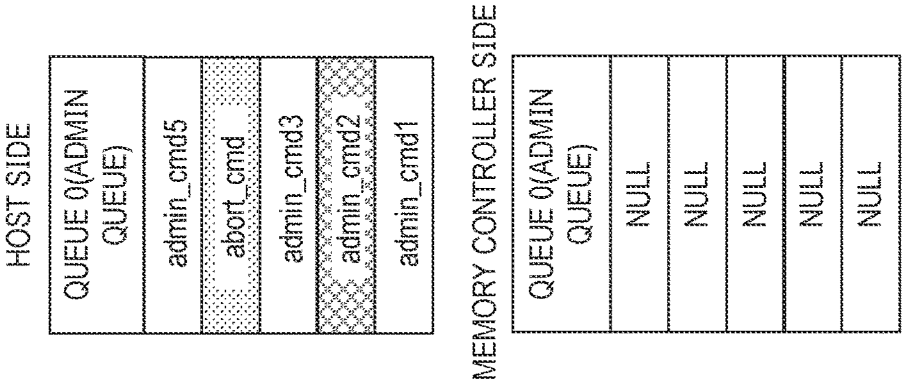
FIGS. 4A to 4D are schematic diagrams illustrating a process of aborting an admin command by an abort command according to an example of the present disclosure.
Figure 4B:
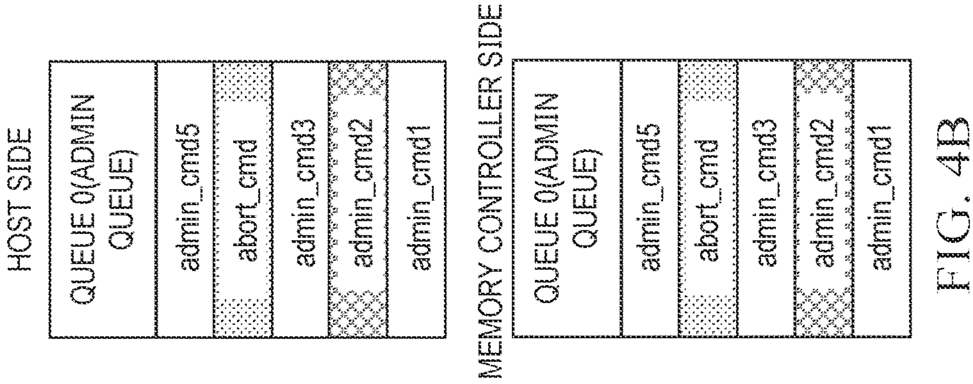
Figure 4C:
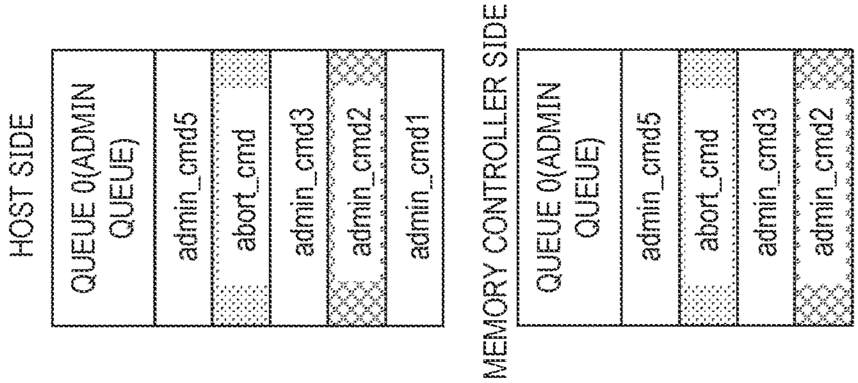
Figure 4D:
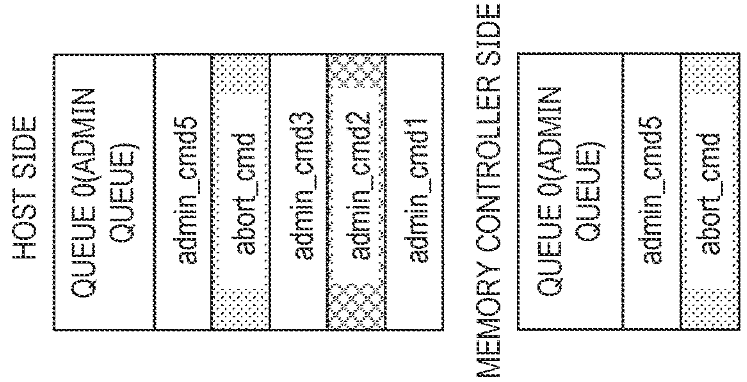

As an example, FIGS. 4A to 4D illustrate an execution process of abort commands in an admin command queue. As shown in FIG. 4A, the host generates 5 admin commands and writes these 5 admin commands into the SQ of the host memory. The fourth admin command is the abort command abort_cmd, and the abort command abort_cmd is to abort the second admin command admin_cmd2 (that is, the target command). As shown in FIG. 4B, the memory controller obtains the above five admin commands from the SQ of the host memory, and the order of the five admin commands obtained into the memory controller is consistent with that in the host. As shown in FIG. 4C, the memory controller executes the five admin commands in sequence in the order determined by the host, that is, the target command admin_cmd2 is executed first, thus missing the best opportunity to abort the target command admin_cmd2. As shown in FIG. 4D, when the memory controller executes the abort command abort_cmd, the execution of the target command admin_cmd2 has completed before the abort command abort_cmd. At this time, while the abort command abort_cmd does not actually abort the target command admin_cmd2, the memory controller will still send a message of successful abort to the host later (that is, regardless of whether the abort command aborts the target command, the memory controller will send information of successful abort to the host).

In this way, on the one hand, the target command may be executed before the abort command, that is, the abort command cannot be executed timely and effectively, resulting in data loss and affecting the data reliability of the memory system. On the other hand, the target command that would otherwise be aborted is executed by the memory controller, which wastes the processing resources of the memory controller and reduces the operating efficiency of the memory system.

Figure 5:
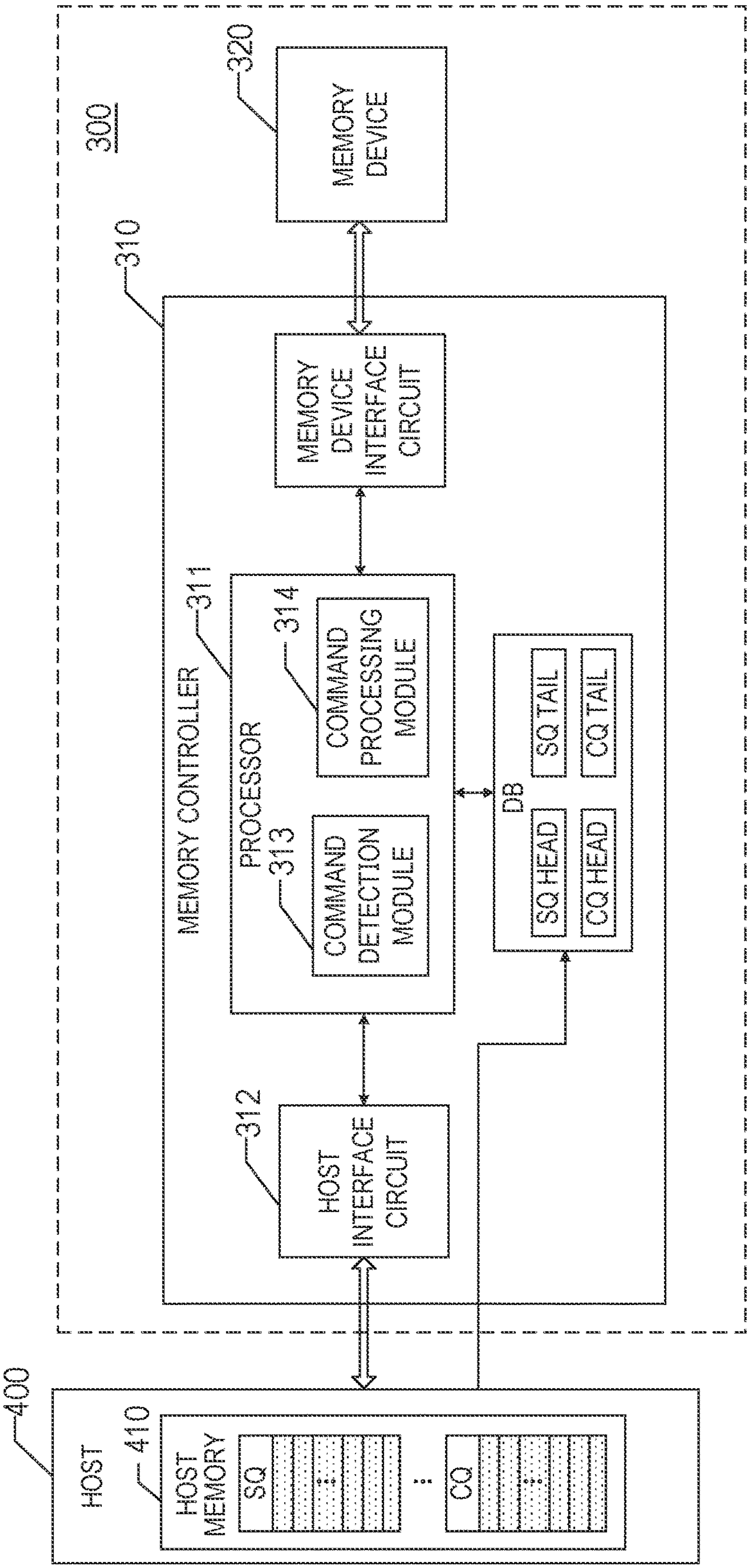
FIG. 5 is a schematic diagram of a memory controller according to an example of the present disclosure.

As shown in FIG. 5, the present disclosure provides a memory controller 310. The memory controller 310 comprises: a host interface circuit 312 configured to: obtain a plurality of commands from a host 400 and queue the plurality of commands in a command queue; and a processor 311 coupled to the host interface circuit 312 and configured to: detect whether there is an abort command in the command queue, wherein the abort command is to instruct to abort a target command in the command queue; and abort the target command in response to the abort command.

In the examples of the present disclosure, the memory controller 310 includes a host interface circuit 312 and a processor 311. The processor 311 may include a central processing unit (CPU), a microprocessor, a digital signal processor (DSP), an application specific integrated circuit (ASIC), a field programmable Gate array (FPGA) or other programmable logic devices, discrete gate or transistor logic devices, discrete hardware components, etc. The processor 311 may also include a general purpose processor or any processor.

The memory controller 310 may communicate at least one of data or commands with the host 400 via the host interface circuit 312. The processor 311 may include a command detection module 313 and a command processing module 314. The command detection module 313 may be configured to detect one or more abort commands, and the command processing module 314 may be configured to execute the abort commands, match and determine target commands, etc. It should be noted that each module of the processor 311 described in the example of the present disclosure may be a software module running on a part of the processor 311 (for example, a microcontroller unit (MCU)), or may be a hardware module of a finite state machine (FSM) (e.g., integrated circuits (ICs, e.g., application specific ICs (ASICs), field programmable gate arrays (FPGAs), etc.)), or may be a combination of software modules and hardware modules.

The host 400 can write multiple commands (and multiple command queues) to the host memory 410 and update the SQ Tail stored in the DB of the memory controller 310. In response to the SQ Tail in the DB being updated, the processor 311 may control the host interface circuit 312 to obtain multiple commands from the host memory 410 and queue the multiple commands in the command queue, wherein the order of the multiple commands obtained by the host interface circuit 312 in the command queue is the same as the order of the multiple commands in the SQ in the host 400. The memory controller 310 may store multiple commands (and multiple command queues) obtained from the host 400 through additional buffers or registers.

After obtaining the multiple commands from the host 400, the processor 311 can detect whether there is an abort command in the command queue, wherein the abort command herein is to instruct to abort the target command in the command queue where it is located, or also instruct to abort target commands in other command queues. The detection operation of the abort command by the processor 311 can be implemented through logical circuits such as a comparator circuit and an arbiter circuit. The abort command can record therein a target command identifier (CID) of the target command, and a target queue identifier (QID) of the target command queue where the target command is located. In this way, the processor 311 reads the target command identifier and the target queue identifier in the abort command to determine the target command queue among multiple command queues, and further determine the target command among multiple commands in the target command queue.

In response to the existence of the abort command in the command queue, the processor 311 may prioritize the execution of the abort command, thereby aborting the corresponding target command. After the execution of the abort command is completed, the abort command and the target command in the command queue are terminated, and the processor 311 can execute the remaining commands in sequence in the original order.

As an example, the host interface circuit 312 obtains an admin command queue from the host memory 410. The admin command queue includes five admin commands admin_cmd1, admin_cmd2, admin_cmd3, abort_cmd, and admin_cmd5 arranged in sequence, of which the fourth admin command is an abort command abort_cmd, and the target command corresponding to the abort command abort_cmd is admin_cmd2. When the processor 311 detects the existence of the abort command abort_cmd, it prioritizes the execution of the abort command abort_cmd first, thereby aborting the target command admin_cmd2. In this way, the abort command abort_cmd and the target command admin_cmd2 in the command queue are terminated, and the processor 311 executes the remaining commands admin_cmd1, admin_cmd3, admin_cmd5 in sequence in the original order.

In this way, on the one hand, the abort command will be executed by the processor timely and effectively to reduce data loss caused by the target command being executed before the abort command and improve the data reliability of the memory system. On the other hand, the target command can be aborted in time, thereby reducing the waste of processing resources caused by the execution of target commands that would otherwise be aborted, and improving the operating efficiency of the memory system.

In some examples, there may be multiple abort commands in an admin command queue obtained by the host interface circuit 312 from the host memory 410. In this case, the abort object (e.g., target command) of any abort command may be an admin command, an I/O command or other abort command. In this way, the execution priorities of the multiple abort commands can be configured according to actual needs. For example, the execution priorities of the multiple abort commands can be determined according to the type of the target command of the abort command. For example, if there are three abort commands in the admin command queue, the first abort command is to abort the I/O command, the second abort command is to abort the admin command, and the third abort command is to abort the second abort command. At this time, according to the preset priority, the third abort command can be executed first, thereby aborting the second abort command, and then the first abort command is executed. That is, an abort command whose target command is another abort command can have a higher execution priority. It can be understood that after executing the third abort command, the third abort command and the second abort command in the command queue are terminated, and the processor 311 can continue to execute the target command of the second abort command.

In some examples, the plurality of commands comprise at least one admin command, the command queue comprises an admin command queue, and the admin command is queued in the admin command queue, and the processor 311 is configured to: detect whether there is a first sub-abort command in the admin command queue, wherein the abort command comprises the first sub-abort command, the first sub-abort command is to instruct to abort a target admin command in the admin command queue, and the target command comprises the target admin command; and abort the target admin command in response to the first sub-abort command.

In this example of the present disclosure, multiple command queues may include an admin command queue, and the admin command queue may include at least one admin command. After obtaining the admin command queue from the host 400, the processor 311 may detect whether there is a first sub-abort command in the admin command queue, wherein the first sub-abort command is to instruct to abort the target admin command in the admin command queue. The detection of the first sub-abort command by the processor 311 can be implemented through logical circuits such as a comparator circuit and an arbiter circuit.

In response to the existence of the first sub-abort command in the admin command queue, the processor 311 may prioritize the execution of the first sub-abort command, thereby aborting the corresponding target admin command. After the execution of the first sub-abort command is completed, the first sub-abort command and the target admin command in the admin command queue are terminated, and the processor 311 can execute the remaining admin commands in sequence in the original order.

Figure 6A:
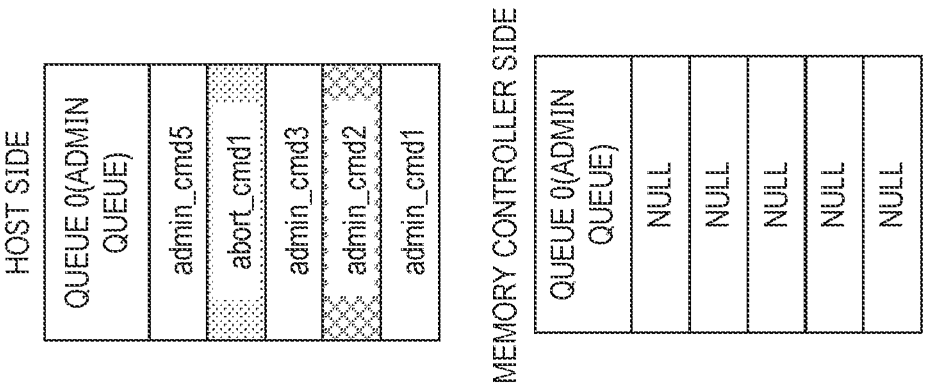
FIGS. 6A to 6C are schematic diagrams illustrating another process of aborting an admin command by an abort command according to an example of the present disclosure.
Figure 6B:
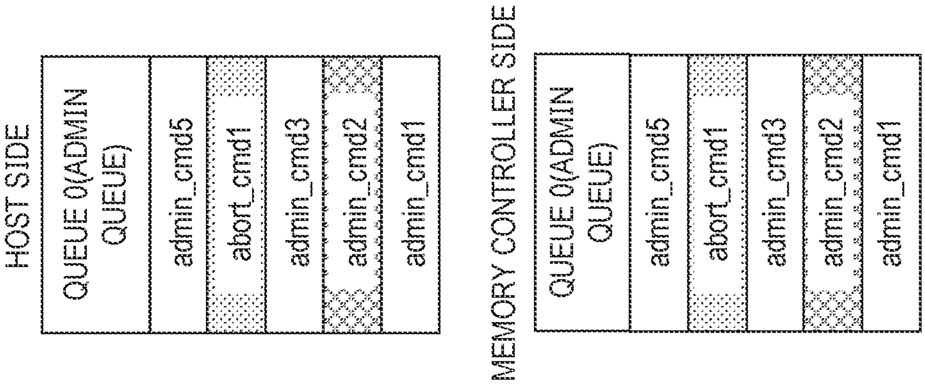
Figure 6C:
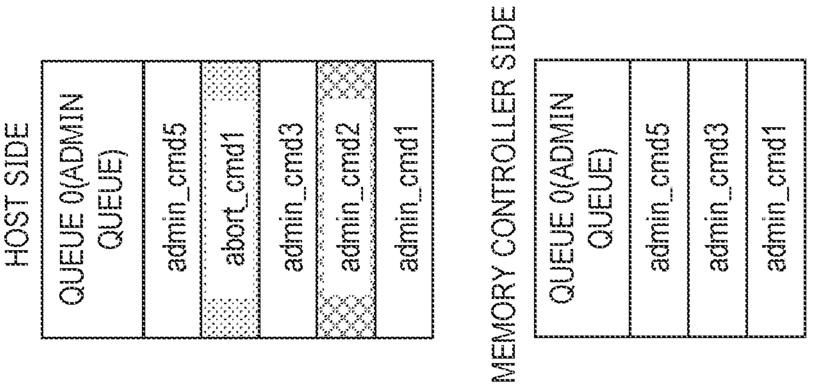

As an example, referring to FIG. 6A, the host generates an admin command queue including 5 admin commands, and stores the admin command queue into the host memory (e.g., SQ in the above example), wherein the fourth admin command is the first sub-abort command abort_cmd1, and the first sub-abort command abort_cmd1 is to abort the second admin command admin_cmd2 (that is, the target admin command). As shown in FIG. 6B, the memory controller obtains the above five admin commands from the host, and the order of the five admin commands obtained into the memory controller is consistent with that in the host. As shown in FIG. 6C, upon detecting the existence of the first sub-abort command abort_cmd1, the processor 311 prioritize the execution of the first sub-abort command abort_cmd1, thereby aborting the target admin command admin_cmd2. In this way, the first sub-abort command abort_cmd1 and the target admin command admin_cmd2 in the admin command queue are terminated, and the processor 311 executes the remaining admin commands admin_cmd1, admin_cmd3, and admin_cmd5 in sequence in the original order.

In this way, the first sub-abort command will be executed by the processor timely and effectively to reduce data loss caused by the target admin command being executed before the first sub-abort command, thereby improving the operating efficiency and data reliability of the memory system.

In some examples, the plurality of commands further comprise at least one I/O command, the command queue further comprises an I/O command queue, and the I/O command is queued in the I/O command queue, and the processor 311 is configured to: detect whether there is a second sub-abort command in the admin command queue, wherein the abort command comprises the second sub-abort command, the second sub-abort command is to instruct to abort a target I/O command in the I/O command queue, and the target command comprises the target I/O command; and abort the target I/O command in response to the second sub-abort command.

In the examples of the present disclosure, the multiple command queues may also include one or more I/O command queues, and the I/O command queue includes at least one I/O command. After obtaining the admin command queue and the I/O command queue from the host 400, the processor 311 may detect whether there is a second sub-abort command in the admin command queue, wherein the second sub-abort command is to instruct to abort the target I/O command in the I/O command queue. The detection of the second sub-abort command by the processor 311 can be implemented through logic circuits such as a comparator circuit and an arbiter circuit.

In response to the existence of the second sub-abort command in the admin command queue, the processor 311 may prioritize the execution of the second sub-abort command, thereby aborting the corresponding target I/O command. After the execution of the second sub-abort command is completed, the second sub-abort command in the admin command queue is terminated, and the target I/O command in the I/O command queue is terminated. The processor 311 can execute the remaining admin commands and the remaining I/O commands in sequence in the original order.

In this way, the second sub-abort command will be executed by the processor timely and effectively to reduce data loss caused by the target I/O command being executed before the second sub-abort command, thereby improving the operating efficiency and data reliability of the memory system.

In some examples, each of the commands has a command identifier, the command identifiers of any two of the commands are different, and the abort command comprises a target command identifier of the target command, and the processor 311 is further configured to: determine the target command identifier of the target command in response to the abort command; and match the command identifiers of the plurality of commands in the command queue with the target command identifier to determine the target command in the command queue.

In the example of the present disclosure, each command has a unique command identifier CID, that is, the command identifiers CID of any two commands are different, and the target command identifier of the target command can be recorded in the abort command. In this way, upon detecting that there is an abort command in the command queue, the processor 311 can read the target command identifier in the abort command, and then match the command identifiers of multiple commands in the command queue with the target command identifier to determine the target command among multiple commands in the command queue. The operation of the processor 311 to match the target command identifier to determine the target command can be implemented through logical circuits such as a comparator circuit and an arbiter circuit.

In some examples, the host interface circuit 312 is further configured to: obtain a plurality of command queues from the host, wherein each of the command queues has a queue identifier, the queue identifiers of any two of the command queues are different, and the abort command further comprises a target queue identifier of the target command queue where the target command is located; the processor 311 is further configured to: determine the target queue identifier of the target command queue in response to the abort command; and match the queue identifiers of the plurality of command queues with the target queue identifier to determine the target command queue in the plurality of command queues.

In the example of the present disclosure, the host interface circuit 312 can obtain an admin command queue and multiple I/O command queues from the host 400, and each command queue has a unique queue identifier QID, that is, the queue identifiers QID of any two command queues are different. The abort command can record therein the target queue identifier of the target command queue where the target command is located. In this way, upon detecting that there is an abort command in the command queue, the processor 311 can read the target queue identifier in the abort command, and then match the queue identifiers of the multiple command queues with the target queue identifiers respectively to determine the target command queue among multiple command queues. The operation of the processor 311 to match the target queue identifier to determine the target command queue can be implemented through logical circuits such as a comparator circuit and an arbiter circuit.

In some examples, the plurality of commands comprise at least one I/O command, the command queue comprises an admin command queue and an I/O command queue, and the I/O command is queued in the I/O command queue, and the processor 311 is configured to: determine the target command identifier of a target I/O command in response to a second sub-abort command, wherein the abort command comprises the second sub-abort command, the second sub-abort command is to instruct to abort the target I/O command in the I/O command queue, and the target command comprises the target I/O command; and match the command identifiers of the I/O commands in the I/O command queue with the target command identifier one by one to determine the target I/O command in the I/O command queue.

In some examples, the host interface circuit 312 is configured to: obtain the I/O commands one by one from the host 400; the processor 311 is configured to: each time one of the I/O commands is obtained, match the command identifier of the obtained one of the I/O commands with the target command identifier to determine the target I/O command.

In the examples of the present disclosure, the host interface circuit 312 may obtain an admin command queue and one or more I/O command queues from the host 400. The processor 311 may detect whether there is a second sub-abort command for aborting the I/O command in the admin command queue. When there is a second sub-abort command in the admin command queue, the processor 311 reads the target queue identifier and the target command identifier recorded in the second sub-abort command. Next, the processor 311 may match the queue identifiers of the multiple I/O command queues with the target queue identifier one by one, thereby determining the target command queue among the multiple I/O command queues. It can be understood that if the host interface circuit 312 only obtains one I/O command queue from the host 400, the processor 311 can directly determine the I/O command queue as the target command queue upon detecting that there is a second sub-abort command in the admin command queue.

After the processor 311 determines the target command queue, the processor 311 can match the command identifiers of the multiple I/O commands in the target command queue with the target command identifier one by one to determine the target I/O command in the target command queue.

In some examples, the host interface circuit 312 may first obtain an admin command queue from the host 400, and the processor 311 detects whether there is the second sub-abort command in the admin command queue. When there is a second sub-abort command in the admin command queue, the processor 311 reads the target queue identifier and the target command identifier recorded in the second sub-abort command. Next, the processor 311 controls the host interface circuit 312 to obtain the queue identifiers of multiple I/O command queues one by one from the host 400, and matches the multiple queue identifiers with the target queue identifier one by one to determine the target command queue. Then, the processor 311 can control the host interface circuit 312 to obtain multiple I/O commands in the target command queue one by one. Each time an I/O command is obtained, the processor 311 matches the command identifier of the obtained I/O command with the target command identifier to determine the target I/O command. Finally, the processor 311 executes the second sub-abort command, thereby aborting the target I/O command. The second sub-abort command in the admin command queue is terminated, and the target I/O command in the target command queue (I/O command queue) is terminated. In this way, the target I/O command will be determined at the first time when it is obtained from the host 400 to the memory controller 310 by the host interface circuit 312. The second sub-abort command can timely and effectively abort the target I/O command to reduce data loss caused by the target I/O command being executed before the second sub-abort command, thereby improving the operating efficiency and data reliability of the memory system.

Figure 7A:
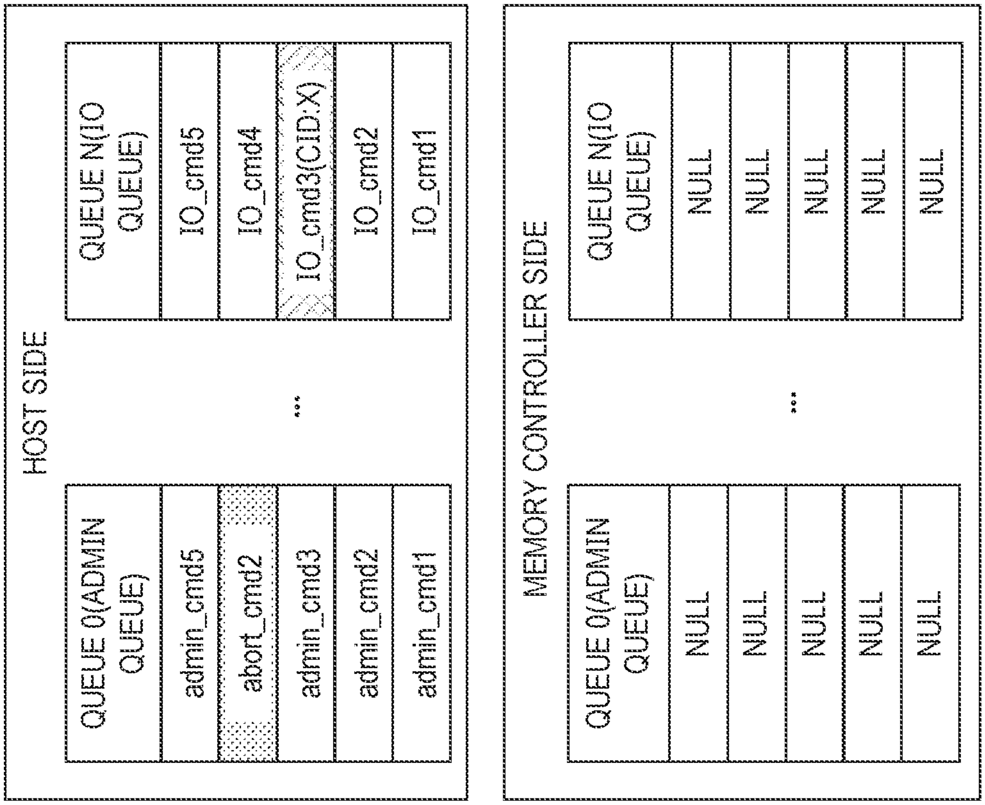
FIGS. 7A to 7D are schematic diagrams illustrating a process of aborting an I/O command by an abort command according to an example of the present disclosure.
Figure 7B:
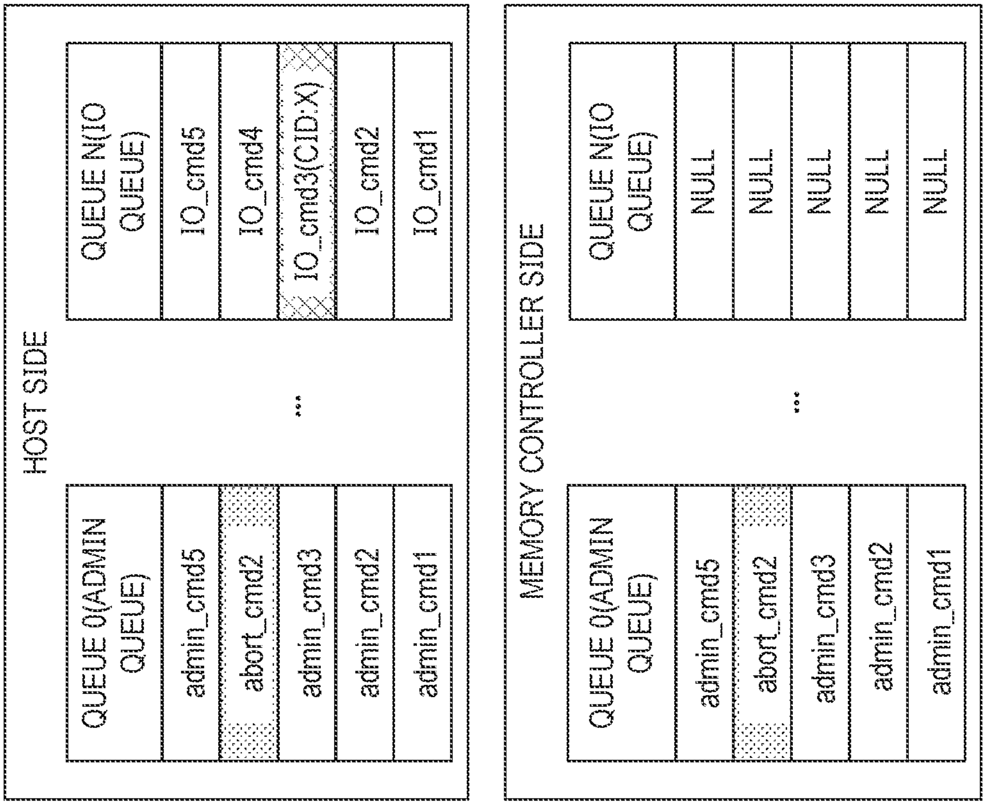
Figure 7C:
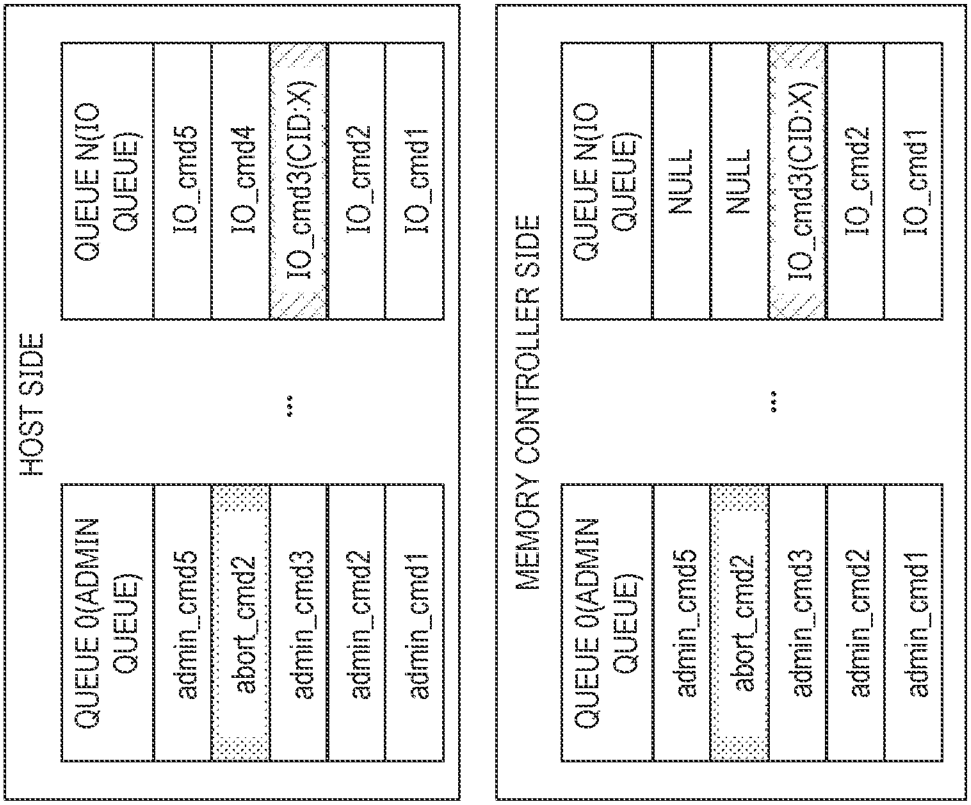
Figure 7D:
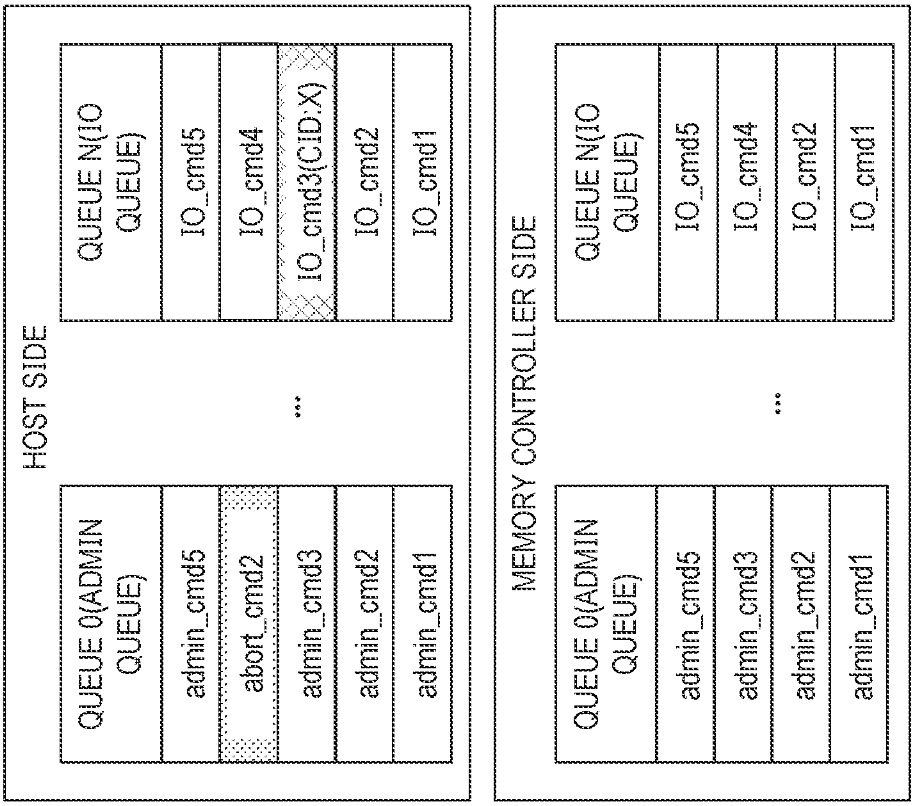

As an example, referring to FIG. 7A, the host generates an admin command queue including five admin commands, and an I/O command queue including five I/O commands, and stores the admin command queue and the I/O command queue into the host memory (e.g., the SQ in the above examples). The fourth admin command in the admin command queue is the second sub-abort command abort_cmd2, and the second sub-abort command abort_cmd2 is to abort the third I/O command IO_cmd3 (e.g., the target I/O command) in the I/O command queue. As shown in FIG. 7B, the memory controller obtains the above five admin commands and five I/O commands from the host, and the order of the five admin commands and five I/O commands obtained into the memory controller is consistent to that in the host. As shown in FIG. 7C, upon detecting the existence of the second sub-abort command abort_cmd2, the processor 311 controls the host interface circuit 312 to obtain multiple I/O commands in the I/O command queue one by one. Each time an I/O command is obtained, the processor 311 matches the command identifier CID of the obtained I/O command with the target command identifier to determine the target I/O command IO_cmd3. When the target I/O command IO_cmd3 is determined, the second sub-abort command abort_cmd2 is executed, thereby aborting the target I/O command IO_cmd3. In this way, as shown in FIG. 7D, the second sub-abort command abort_cmd2 in the admin command queue is terminated, and the target I/O command IO_cmd3 in the I/O command queue is terminated. The processor 311 executes the remaining admin commands admin_cmd1, admin_cmd2, admin_cmd3 and admin_cmd5 and the remaining I/O commands IO_cmd1, IO_cmd2, IO_cmd4 and IO_cmd5 in sequence in the original order.

It should be noted that the number of commands in the above-mentioned admin command queue and I/O command queue is only an example, and this disclosure does not place excessive restrictions on the number of commands in the command queue.

In some examples, the processor 311 is configured to: obtain the number of the I/O commands to be sent at a preset moment in the host 400; and each time one of the I/O commands for the preset moment is obtained, match the command identifier of the obtained one of the I/O commands for the preset moment with the target command identifier to determine the target I/O command.

In some examples, the processor 311 is further configured to: when the I/O commands updated after the preset moment are obtained, the matching of the command identifiers of the updated I/O commands with the target command identifier is no longer performed.

In the examples of the present disclosure, the processor 311 may also obtain the number of I/O commands to be sent at a preset moment in the host 400. The preset moment herein refers to the moment when the host 400 writes multiple I/O commands into the host memory after generating the multiple I/O commands. Since the host 400 may generate other I/O commands (or admin commands) after a certain period of time, the I/O command queue in host memory may be updated.

The processor 311 may obtain the number of I/O commands to be sent at the preset moment in the host 400, and only perform command identifier matching on multiple I/O commands at this moment, that is, within the number of I/O commands to be sent by the host at the preset moment, to determine the target I/O command among the multiple I/O commands generated by the host 400 at this moment, thereby preventing new I/O commands generated subsequently by the host 400 and updated into the host memory from being determined as the target I/O command.

For example, the processor 311 may obtain the SQ Head and SQ Tail of the DB at a preset moment. For example, if the host generates an SQ including five I/O commands, the SQ Tail is 5 at this time, and since the memory controller 310 has not obtained the I/O commands from the host, the SQ Head is 0 at this time. In this way, the processor 311 only controls the host interface circuit 312 to obtain the I/O commands from the host memory 410 one by one when the SQ Head is less than or equal to 5. When SQ Head is equal to 5, that is, when all the multiple I/O commands generated by the host 400 at the preset moment have been obtained into the memory controller 310, the processor 311 will no longer perform the matching of the command identifier of the updated I/O command with the target command identifier if the host interface circuit 312 continues to obtain I/O commands from the host at this moment, thereby preventing new I/O commands generated subsequently by the host 400 and updated into the host memory from being determined as the target I/O command.

Based on the above memory controller, the present disclosure provides an operation method of a memory controller, the memory controller comprising a host interface circuit and a processor, and the operation method comprising: obtaining, by the host interface circuit, a plurality of commands from a host and queue the plurality of commands in a command queue; detecting, by the processor, whether there is an abort command in the command queue, wherein the abort command is to instruct to abort a target command in the command queue; and aborting, by the processor, the target command in response to the abort command.

In some examples, the plurality of commands comprise at least one admin command, the command queue comprises an admin command queue, and the admin command is queued in the admin command queue, and detecting, by the processor, whether there is an abort command in the command queue comprises: detecting, by the processor, whether there is a first sub-abort command in the admin command queue, wherein the abort command comprises the first sub-abort command, the first sub-abort command is to instruct to abort a target admin command in the admin command queue, and the target command comprises the target admin command; and aborting, by the processor, the target command in response to the abort command comprises: aborting, by the processor, the target admin command in response to the first sub-abort command.

In some examples, the plurality of commands further comprise at least one I/O command, the command queue further comprises an I/O command queue, and the I/O command is queued in the I/O command queue, and detecting, by the processor, whether there is an abort command in the command queue comprises: detecting, by the processor, whether there is a second sub-abort command in the admin command queue, wherein the abort command comprises the second sub-abort command, the second sub-abort command is to instruct to abort a target I/O command in the I/O command queue, and the target command comprises the target I/O command; and aborting, by the processor, the target command in response to the abort command comprises: aborting, by the processor, the target I/O command in response to the second sub-abort command.

In some examples, each of the commands has a command identifier, the command identifiers of any two of the commands are different, and the abort command comprises a target command identifier of the target command, and the operation method further comprises: determining, by the processor, the target command identifier of the target command in response to the abort command; and matching, by the processor, the command identifiers of the plurality of commands in the command queue with the target command identifier to determine the target command in the command queue.

In some examples, the operation method further comprises: obtaining, by the host interface circuit, a plurality of command queues from the host, each of the command queues has a queue identifier, the queue identifiers of any two of the command queues are different, and the abort command further comprises a target queue identifier of the target command queue where the target command is located; determining, by the processor, the target queue identifier of the target command queue in response to the abort command; and matching, by the processor, the queue identifiers of the plurality of command queues with the target queue identifier to determine the target command queue in the plurality of command queues.

In some examples, the plurality of commands comprise at least one I/O command, the command queue comprises an admin command queue and an I/O command queue, and the I/O command is queued in the I/O command queue, and determining, by the processor, the target command identifier in response to the abort command comprises: determining, by the processor, the target command identifier of a target I/O command in response to the second sub-abort command, wherein the abort command comprises the second sub-abort command, the second sub-abort command is to instruct to abort the target I/O command in the I/O command queue, and the target command comprises the target I/O command; and matching, by the processor, the command identifiers of the plurality of commands in the command queue with the target command identifier comprises: matching, by the processor, the command identifiers of the I/O commands in the I/O command queue with the target command identifier one by one to determine the target I/O command in the I/O command queue.

In some examples, obtaining, by the host interface circuit, a plurality of commands from a host comprises: obtaining, by the host interface circuit, the I/O commands one by one from the host; and matching, by the processor, the command identifiers of the I/O commands in the I/O command queue with the target command identifier one by one comprises: each time one of the I/O commands is obtained by the host interface circuit, matching, by the processor, the command identifier of the obtained one of the I/O commands with the target command identifier to determine the target I/O command.

In some examples, each time one of the I/O commands is obtained by the host interface circuit, matching, by the processor, the command identifier of the obtained one of the I/O commands with the target command identifier comprises: obtaining, by the processor, the number of the I/O commands to be sent at a preset moment in the host; and each time one of the I/O commands for the preset moment is obtained by the host interface circuit, matching, by the processor, the command identifier of the obtained one of the I/O commands for the preset moment with the target command identifier to determine the target I/O command.

In some examples, the operation method further comprises: when the I/O commands updated after the preset moment are obtained by the host interface circuit, the matching of the command identifiers of the updated I/O commands with the target command identifier is no longer performed by the processor.

The present disclosure provides a memory system, comprising the memory controller set forth in any of the above examples and a memory device, wherein the memory controller is configured to control the memory device.

The present disclosure provides an electronic device, comprising the memory system set forth in the above examples.

In the examples of the present disclosure, the electronic device may be a mobile phone, a desktop computer, a laptop computer, a tablet computer, a vehicle computer, a game console, a printer, a positioning device, a wearable electronic device, a smart sensor, a virtual reality device, an augmented reality device or any other suitable electronic devices having the above described memory system therein.

The present disclosure provides a computer-readable storage medium storing thereon executable instructions that, when executed, implement the operation method set forth in any of the above examples.

For example, executable instructions may be stored in the memory device 320 and may be executed by the processor 311, thereby implementing the above operation method of the memory controller. In some examples, the executable instructions may be firmware. In this way, on the one hand, the abort command will be executed by the processor timely and effectively to reduce data loss caused by the target command being executed before the abort command and improve the data reliability of the memory system. On the other hand, the target command can be aborted in time, thereby reducing the waste of processing resources caused by the execution of target commands that would otherwise be aborted, and improving the operating efficiency of the memory system.

It will be understood that reference throughout this specification to "one example" or "an example" means that a particular feature, structure, or characteristic associated with the example is included in at least one example of the present disclosure. Thus, the appearances of "in one example" or "in an example" in various places throughout this specification are not referring to the same example. Furthermore, the particular features, structures or characteristics may be combined in any suitable manner in one or more examples. It should be understood that in various examples of the present disclosure, the size of the sequence numbers of the above-mentioned processes does not mean the order of execution. The execution order of each process should be determined by its functions and internal logic, and should not constitute any limitation to the implementation process of the present disclosure. The above sequence numbers of the examples of the present disclosure are only for description and do not represent the advantages and disadvantages of the examples.

The above are only examples of the present disclosure, and do not limit the patent scope of the present disclosure. Equivalent structural transformations that are made based on the contents of the description and drawings of the present disclosure or direct/indirect applications in other related technical fields under the inventive concept of the present disclosure are included in the patent protection scope of the present disclosure.

What is claimed is:

1. A memory controller, comprising:

a host interface circuit configured to:

obtain commands from a host and queue the commands in a buffer; and a processor coupled to the host interface circuit and configured to:

detect whether there is an abort command in the commands, wherein the abort command is to instruct to abort a target command in the commands; and in response to detecting the existence of the abort command in the commands:

prioritize execution of the abort command above other commands in the commands;

abort the target command in response to execution of the abort command; and after execution of the abort command to abort execution of the target command, resume execution of remaining commands in the commands in sequence in an original order of the commands.

2. The memory controller according to claim 1, wherein the commands comprise at least one admin command, and the processor is configured to:

detect whether there is a first sub-abort command in the at least one admin command, wherein the abort command comprises the first sub-abort command, the first sub-abort command is to instruct to abort a target admin command in the at least one admin command, and the target command comprises the target admin command; and abort the target admin command in response to the first sub-abort command.

3. The memory controller according to claim 2, wherein the commands further comprise at least one I/O command, and the processor is configured to:

detect whether there is a second sub-abort command in the at least one admin command, wherein the abort command comprises the second sub-abort command, the second sub-abort command is to instruct to abort a target I/O command in the at least one I/O command, and the target command comprises the target I/O command; and abort the target I/O command in response to the second sub-abort command.

4. The memory controller according to claim 1, wherein each of the commands has a command identifier, the command identifiers of any two of the commands are different, and the abort command comprises a target command identifier of the target command, and the processor is further configured to:

determine the target command identifier of the target command in response to the abort command; and match the command identifiers of the commands with the target command identifier to determine the target command.

5. The memory controller according to claim 4, wherein the host interface circuit is further configured to:

obtain command sets from the host, wherein each command set has a command set identifier, command set identifiers of any two command sets are different, and the abort command further comprises a target command set identifier of a target command set where the target command is located; and the processor is further configured to:

determine the target command set identifier of the target command set in response to the abort command; and match the command set identifiers of the command sets with the target command set identifier to determine the target command set in the command sets.

6. The memory controller according to claim 4, wherein the commands comprise at least one I/O command, and the processor is configured to:

determine the target command identifier of a target I/O command in response to a second sub-abort command, wherein the abort command comprises the second sub-abort command, the second sub-abort command is to instruct to abort the target I/O command, and the target command comprises the target I/O command; and match the command identifiers of the I/O commands with the target command identifier one by one to determine the target I/O command.

7. The memory controller according to claim 6, wherein the host interface circuit is configured to:

obtain the I/O commands one by one from the host; and the processor is configured to:

each time one of the I/O commands is obtained, match the command identifier of the obtained one of the I/O commands with the target command identifier to determine the target I/O command.

8. The memory controller according to claim 7, wherein the processor is configured to:

obtain a number of the I/O commands to be sent at a preset moment in the host; and each time one of the I/O commands for the preset moment is obtained, match the command identifier of the obtained one of the I/O commands for the preset moment with the target command identifier to determine the target I/O command.

9. The memory controller according to claim 8, wherein the processor is further configured to:

in response to I/O commands updated after the preset moment are obtained, the matching of the command identifiers of the updated I/O commands with the target command identifier is no longer performed.

10. A method of operating a memory controller, the memory controller comprising a host interface circuit and a processor, and the method comprising:

obtaining, by the host interface circuit, commands from a host and queue the commands in a buffer;

detecting, by the processor, whether there is an abort command in the commands, wherein the abort command is to instruct to abort a target command in the commands; and in response to detecting the existence of the abort command in the commands:

prioritizing execution of the abort command above other commands in the commands;

aborting, by the processor, the target command in response to execution of the abort command; and after execution of the abort command to abort execution of the target command, resuming execution of remaining commands in the commands in sequence in an original order of the commands.

11. The method according to claim 10, wherein the commands comprise at least one admin command, and detecting, by the processor, whether there is an abort command in the commands comprises:

detecting, by the processor, whether there is a first sub-abort command in the at least one admin command, wherein the abort command comprises the first sub-abort command, the first sub-abort command is to instruct to abort a target admin command in the at least one admin command, and the target command comprises the target admin command; and aborting, by the processor, the target command in response to the abort command comprises:

aborting, by the processor, the target admin command in response to the first sub-abort command.

12. The method according to claim 11, wherein the commands further comprise at least one I/O command, and detecting, by the processor, whether there is an abort command in the commands comprises:

detecting, by the processor, whether there is a second sub-abort command in the at least one admin command, wherein the abort command comprises the second sub-abort command, the second sub-abort command is to instruct to abort a target I/O command in the at least one I/O command, and the target command comprises the target I/O command; and aborting, by the processor, the target command in response to the abort command comprises:

aborting, by the processor, the target I/O command in response to the second sub-abort command.

13. The method according to claim 10, wherein each of the commands has a command identifier, the command identifiers of any two of the commands are different, and the abort command comprises a target command identifier of the target command, and the method further comprises:

determining, by the processor, the target command identifier of the target command in response to the abort command; and matching, by the processor, the command identifiers of the commands with the target command identifier to determine the target command.

14. The method according to claim 13, further comprising:

obtaining, by the host interface circuit, command sets from the host, wherein each command set has a command set identifier, command set identifiers of any two command sets are different, and the abort command further comprises a target command set identifier of a target where the target command is located;

determining, by the processor, the target command set identifier of the target command set in response to the abort command; and matching, by the processor, the command set identifiers of the command sets with the target command set identifier to determine the target command set in the command sets.

15. The method according to claim 13, wherein the commands comprise at least one I/O command, and determining, by the processor, the target command identifier in response to the abort command comprises:

determining, by the processor, the target command identifier of a target I/O command in response to a second sub-abort command, wherein the abort command comprises the second sub-abort command, the second sub-abort command is to instruct to abort the target I/O command, and the target command comprises the target I/O command; and matching, by the processor, the command identifiers of the commands with the target command identifier comprises:

matching, by the processor, the command identifiers of the I/O commands with the target command identifier one by one to determine the target I/O command.

16. The method according to claim 15, wherein obtaining, by the host interface circuit, commands from a host comprises:

obtaining, by the host interface circuit, the I/O commands one by one from the host; and matching, by the processor, the command identifiers of the I/O commands with the target command identifier one by one comprises:

each time one of the I/O commands is obtained by the host interface circuit, matching, by the processor, the command identifier of the obtained one of the I/O commands with the target command identifier to determine the target I/O command.

17. The method according to claim 16, wherein each time one of the I/O commands is obtained by the host interface circuit, matching, by the processor, the command identifier of the obtained one of the I/O commands with the target command identifier comprises:

obtaining, by the processor, a number of the I/O commands to be sent at a preset moment in the host; and each time one of the I/O commands for the preset moment is obtained by the host interface circuit, matching, by the processor, the command identifier of the obtained one of the I/O commands for the preset moment with the target command identifier to determine the target I/O command.

18. The method according to claim 17, further comprising:

in response to the I/O commands updated after the preset moment are obtained by the host interface circuit, the matching of the command identifiers of updated I/O commands with the target command identifier is no longer performed by the processor.

19. A memory system, comprising:

a memory device; and a memory controller configured to control the memory device and comprising:

a host interface circuit configured to:

obtain commands from a host and queue the commands in a buffer; and a processor coupled to the host interface circuit and configured to:

detect whether there is an abort command in the commands, wherein the abort command is to instruct to abort a target command in the commands; and in response to detecting the existence of the abort command in the commands:

prioritize execution of the abort command above other commands in the commands;

abort the target command in response to execution of the abort command; and after execution of the abort command to abort execution of the target command, resume execution of remaining commands in the commands in sequence in an original order of the commands.

20. The memory system according to claim 19, wherein the commands comprise at least one admin command, and the processor is configured to:

detect whether there is a first sub-abort command in the at least one admin command, wherein the abort command comprises the first sub-abort command, the first sub-abort command is to instruct to abort a target admin command in the at least one admin command, and the target command comprises the target admin command; and abort the target admin command in response to the first sub-abort command.

* * * * *